(12) United States Patent
Plata et al.

(10) Patent No.: US 11,745,681 B2
(45) Date of Patent: Sep. 5, 2023

(54) BATTERY BRACKET ASSEMBLY FOR A VEHICLE

(71) Applicants: Nissan North America, Inc., Franklin, TN (US); NISSAN MOTOR CO., LTD., Yokohama (JP)

(72) Inventors: Arnold Plata, Toluca (MX); Takashi Kawaoto, Kanagawa (JP)

(73) Assignees: Nissan North America, Inc., Franklin, TN (US); NISSAN MOTOR CO., LTD, Yokohama (JP)

( * ) Notice: Subject to any disclaimer, the term of this patent is extended or adjusted under 35 U.S.C. 154(b) by 118 days.

(21) Appl. No.: 17/107,755

(22) Filed: Nov. 30, 2020

(65) Prior Publication Data

US 2022/0169194 A1 Jun. 2, 2022

(51) Int. Cl.
*H01M 50/20* (2021.01)
*B60R 16/04* (2006.01)

(52) U.S. Cl.
CPC ............. *B60R 16/04* (2013.01); *H01M 50/20* (2021.01); *H01M 2220/20* (2013.01)

(58) Field of Classification Search
CPC ..... B60R 16/04; H01M 50/20; H01M 50/209; H01M 50/64
USPC ........................................................ 180/68.5
See application file for complete search history.

(56) References Cited

U.S. PATENT DOCUMENTS

| | | | | |
|---|---|---|---|---|
| 2,849,074 A * | 8/1958 | Key | ...................... | H01M 50/20 180/68.5 |
| 4,317,497 A * | 3/1982 | Alt | ........................ | H01M 50/20 180/68.5 |
| 4,327,809 A * | 5/1982 | Fenstermaker | ......... | B60R 16/04 180/68.5 |
| 4,754,827 A * | 7/1988 | Hirabayashi | ............ | B60R 16/04 180/68.5 |
| 4,936,409 A * | 6/1990 | Nix | ....................... | H01M 50/20 180/68.5 |
| 5,636,701 A * | 6/1997 | Norman | ................... | B60R 16/04 180/68.5 |
| 6,102,356 A * | 8/2000 | Huntley | .................. | B60L 50/64 248/500 |
| 6,521,371 B1 * | 2/2003 | Lavanture | ............. | H01M 50/20 429/96 |

(Continued)

FOREIGN PATENT DOCUMENTS

KR 101944308 B1 2/2019

*Primary Examiner* — Hau V Phan
(74) *Attorney, Agent, or Firm* — Global IP Counselors, LLP (57) ABSTRACT

A battery bracket assembly for a vehicle includes a mounting bracket configured to be connected to a vehicle frame and to receive a battery. The mounting bracket includes a base, and a first wall extending upwardly from a first end of the base. A second wall extends upwardly from a second end of the base. First and second tabs extend from first and second ends of the first wall. The first and second tabs extend toward the second wall. Third and fourth tabs extend from first and second ends of the second wall. The third and fourth tabs extend toward the first wall. A third wall extends from a first side of the base. A fourth wall extends from a second side of the base. The first and third tabs are connected to the third wall and the second and fourth tabs are connected to the fourth wall.

20 Claims, 10 Drawing Sheets

(56) References Cited

U.S. PATENT DOCUMENTS

| | | | |
|---|---|---|---|
| 7,014,002 B2* | 3/2006 | Mizuta | B60R 16/04 180/68.5 |
| 7,913,786 B2* | 3/2011 | Voigt | B60R 16/04 180/68.5 |
| 8,562,036 B2* | 10/2013 | Zhou | H01M 50/209 429/96 |
| 9,660,233 B2* | 5/2017 | Kim | H01M 50/20 |
| 10,165,704 B2* | 12/2018 | Matsunaga | B60L 50/70 |
| 10,249,858 B2* | 4/2019 | Konoura | B60R 16/04 |
| 2018/0366703 A1* | 12/2018 | Izumi | B60R 16/04 |

* cited by examiner

BATTERY BRACKET ASSEMBLY FOR A VEHICLE

BACKGROUND

Field of the Invention

The present invention generally relates to a battery bracket assembly for a vehicle.

Background Information

A vehicle includes a battery bracket to attach a battery to a vehicle frame.

SUMMARY

One object of the disclosure is to provide a battery bracket assembly for a vehicle that attaches a battery to a vehicle frame.

In view of the state of the known technology, one aspect of the present invention is to provide a battery bracket assembly for a vehicle. The battery bracket assembly includes a mounting bracket configured to be connected to a vehicle frame and to receive a battery. The mounting bracket includes a base, and a first wall extending upwardly from a first end of the base. A second wall extends upwardly from a second end of the base. First and second tabs extend from first and second ends of the first wall. The first and second tabs extend toward the second wall. Third and fourth tabs extend from first and second ends of the second wall. The third and fourth tabs extend toward the first wall. A third wall extends from a first side of the base. A fourth wall extends from a second side of the base. The first and third tabs are connected to the third wall and the second and fourth tabs are connected to the fourth wall.

Another aspect of the present invention is to provide a battery bracket assembly for a vehicle. The battery assembly includes a mounting bracket connected to a vehicle frame. A battery is mounted to the mounting bracket. The mounting bracket includes a base. At least one first fastener hole is disposed in the base. A first wall extends upwardly from a first end of the base. A second wall extends upwardly from a second end of the base. At least one second fastener hole is disposed in the second wall of the base. First and second tabs extend from first and second ends of the first wall. The first and second tabs extend toward the second wall. Third and fourth tabs extend from first and second ends of the second wall. The third and fourth tabs extend toward the first wall. A third wall extends from a first side of the base. A fourth wall extends from a second side of the base. The first and third tabs are connected to the third wall. The second and fourth tabs are connected to the fourth wall. The at least one first and second fastener holes receive a fastener to secure the mounting bracket to the vehicle frame.

Also other objects, features, aspects and advantages of the disclosed battery bracket assembly for a vehicle will become apparent to those skilled in the art from the following detailed description, which, taken in conjunction with the annexed drawings, discloses exemplary embodiments of the battery bracket assembly for a vehicle.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Referring initially to FIGS. 1-6, a battery bracket assembly 10 in accordance with an exemplary embodiment of the present invention is configured to be connected to a vehicle frame 12 of a vehicle. The battery bracket assembly 10 is configured to receive a battery 14. The battery 14 is configured to facilitate starting the vehicle and to supply power to electrical systems of the vehicle.

A battery assembly 16 for the vehicle includes the vehicle frame 12, the battery bracket assembly 10, the battery 14, and a battery tray 18, as shown in FIGS. 1-6. The battery bracket assembly 10 includes a mounting bracket 20 configured to be connected to the vehicle frame 12 and to receive the battery 14.

Figure 1:
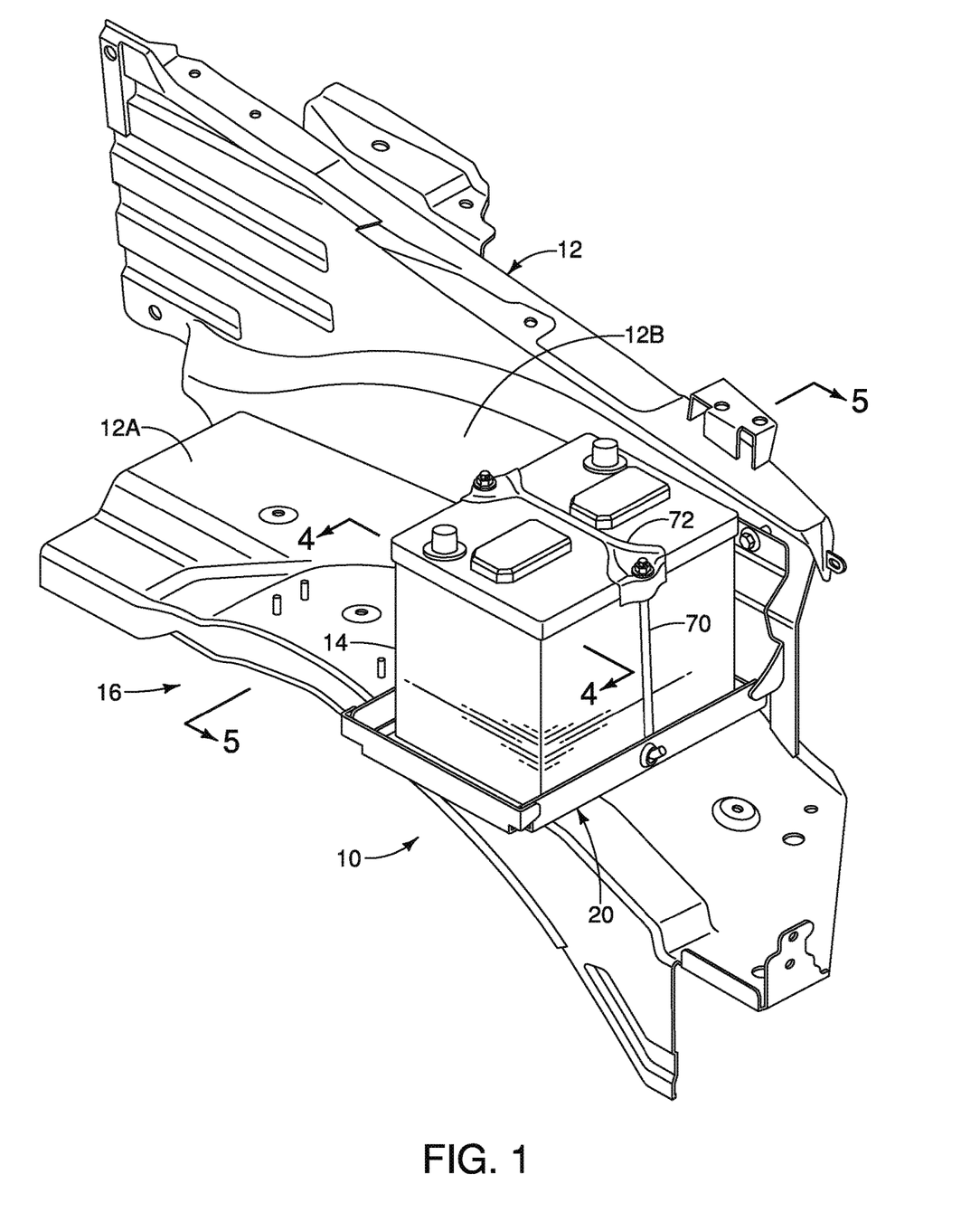
FIG. 1 is a perspective view of a battery bracket assembly in accordance with an exemplary embodiment of the present invention attaching a battery to a vehicle frame.
Figure 2:
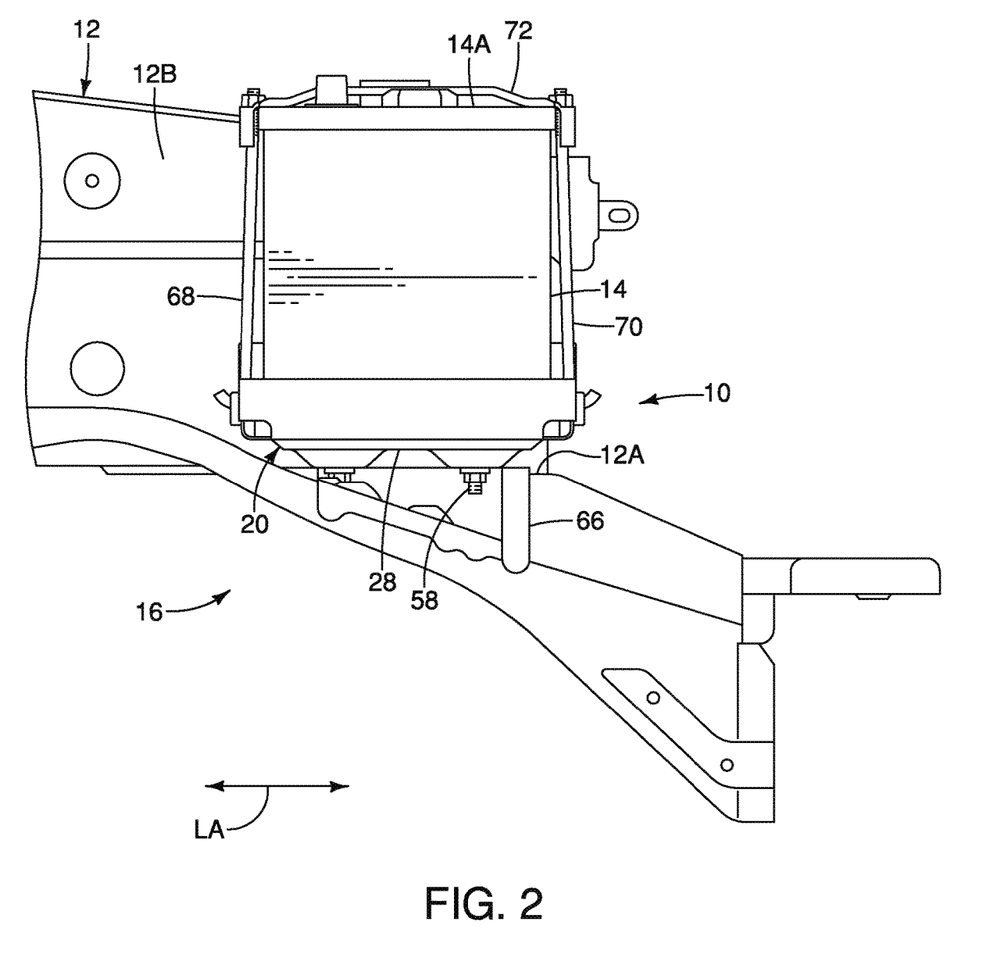
FIG. 2 is a rear elevational view of the battery bracket assembly connected to the vehicle frame of FIG. 1.
Figure 3:
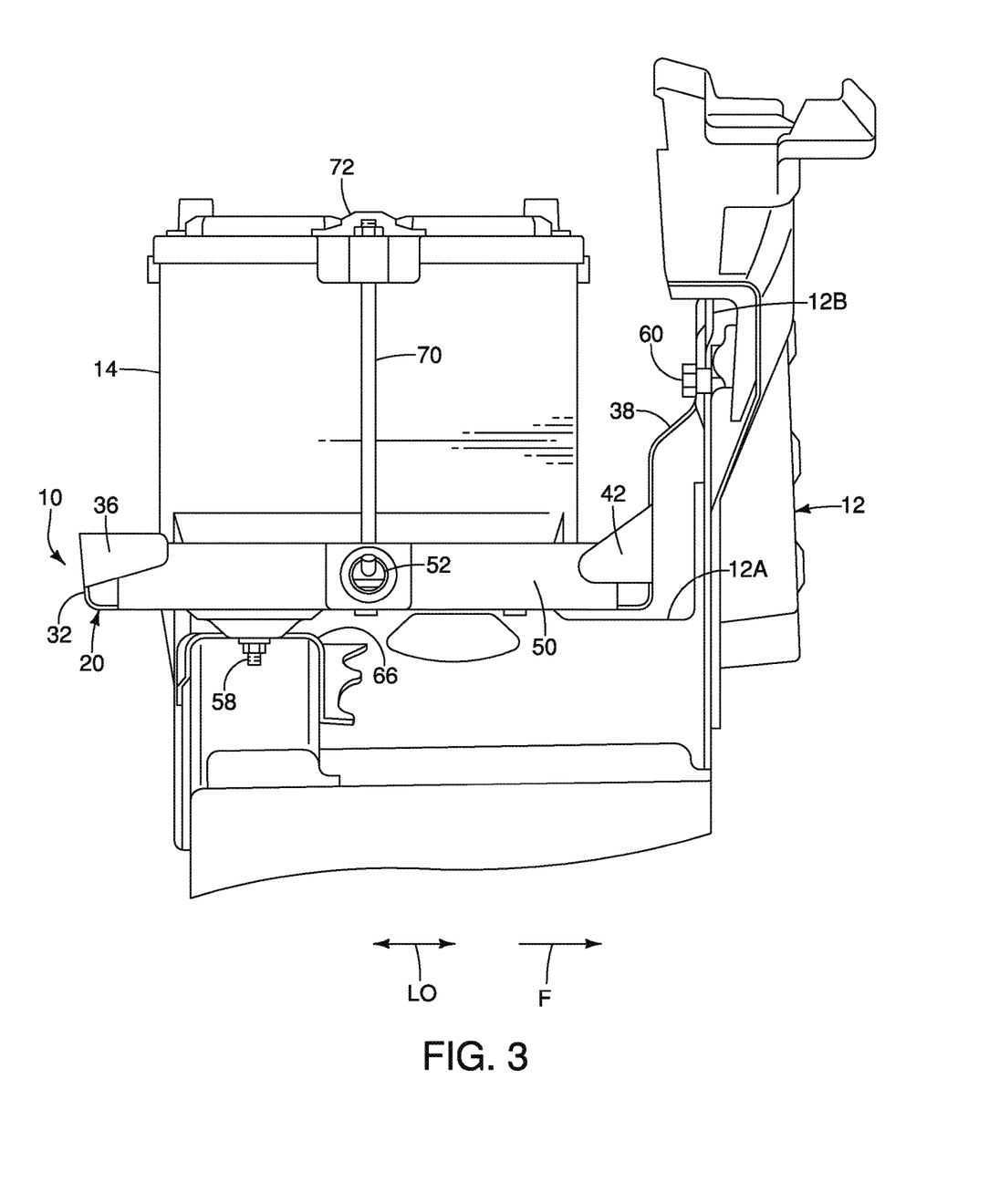
FIG. 3 is a side elevational view of the battery bracket assembly connected to the vehicle frame of FIG. 1.

The frame 12 includes a first portion 12A and a second portion 12B connected to the first portion 12A, as shown in FIGS. 1 and 2. The first portion 12A is substantially horizontal. The second portion 12B is substantially vertical. As shown in FIG. 3, the second portion 12B is disposed in a forward direction F of the vehicle relative to the first portion 12A.

Figure 7:
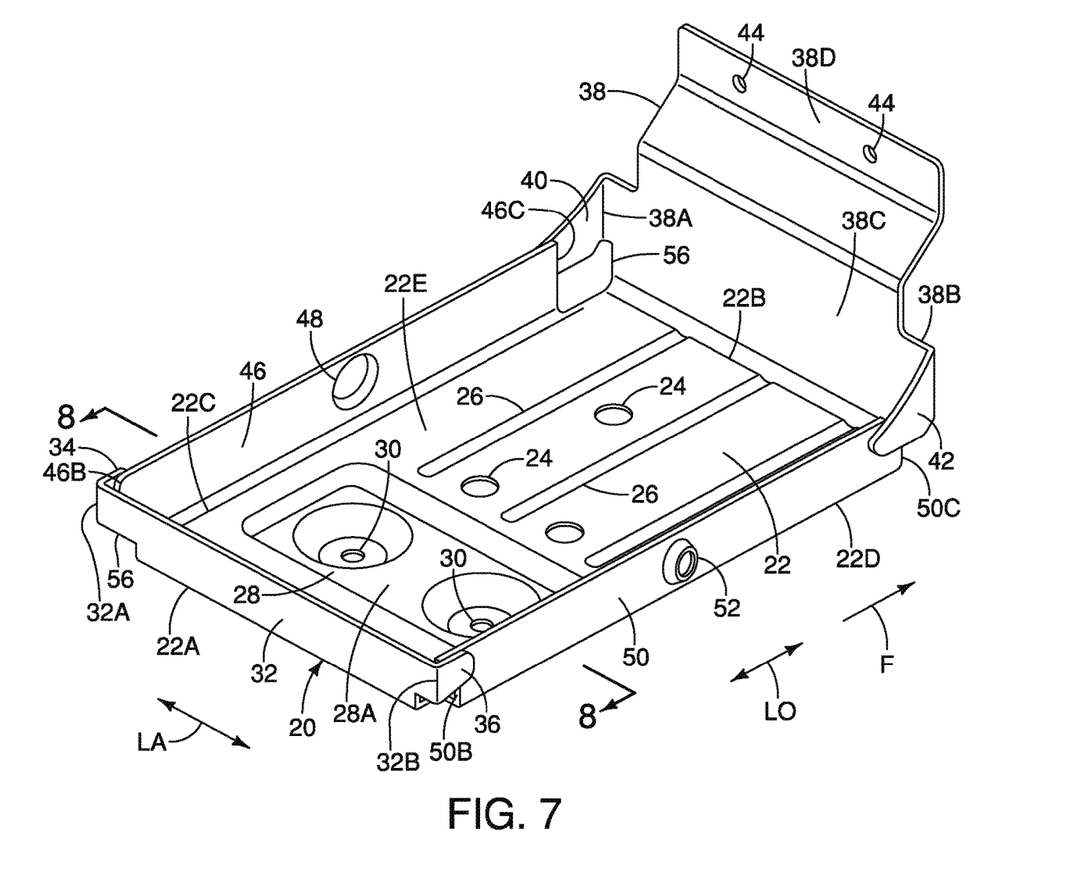
FIG. 7 is a perspective view of the battery bracket assembly of FIG. 1.
Figure 8:
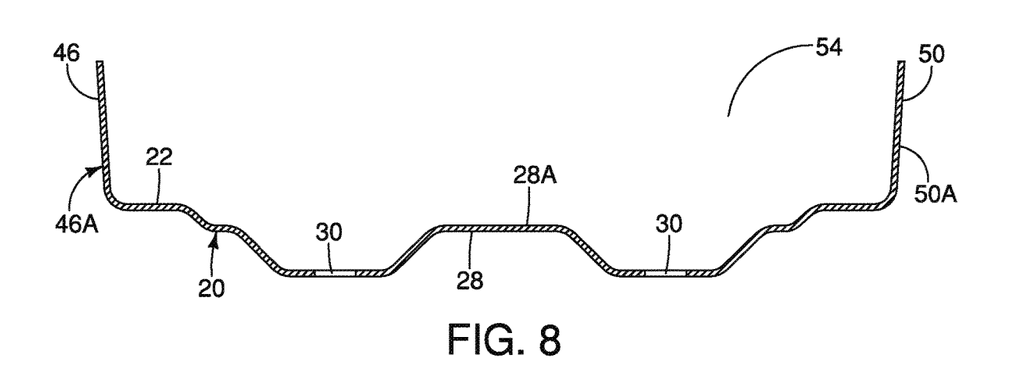
FIG. 8 is a rear elevational view in cross section of the battery bracket assembly of FIG. 7.
Figure 9:
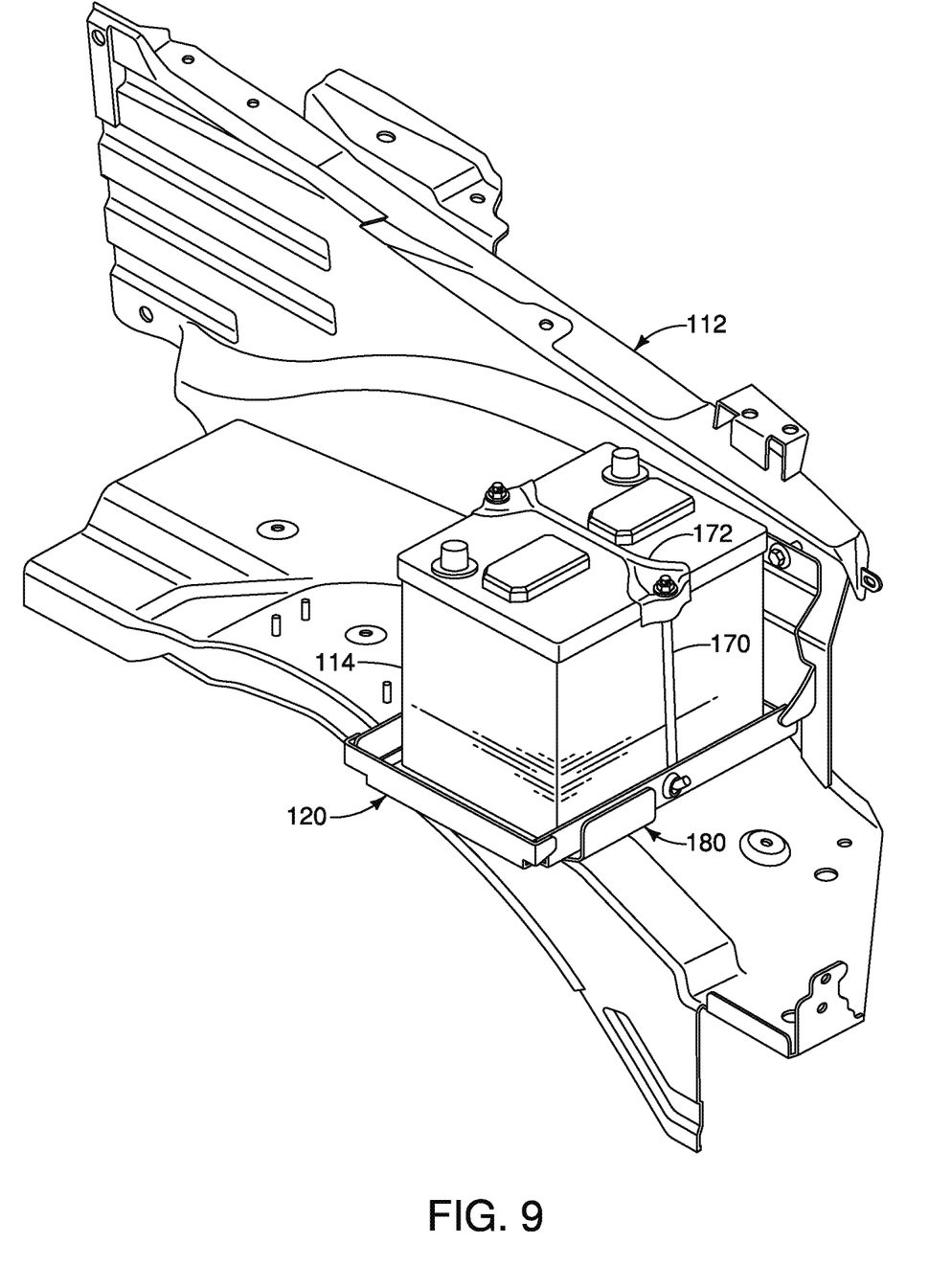
FIG. 9 is a perspective view of a battery bracket assembly in accordance with a second exemplary embodiment of the present invention attaching a battery to a vehicle frame.
Figure 10:
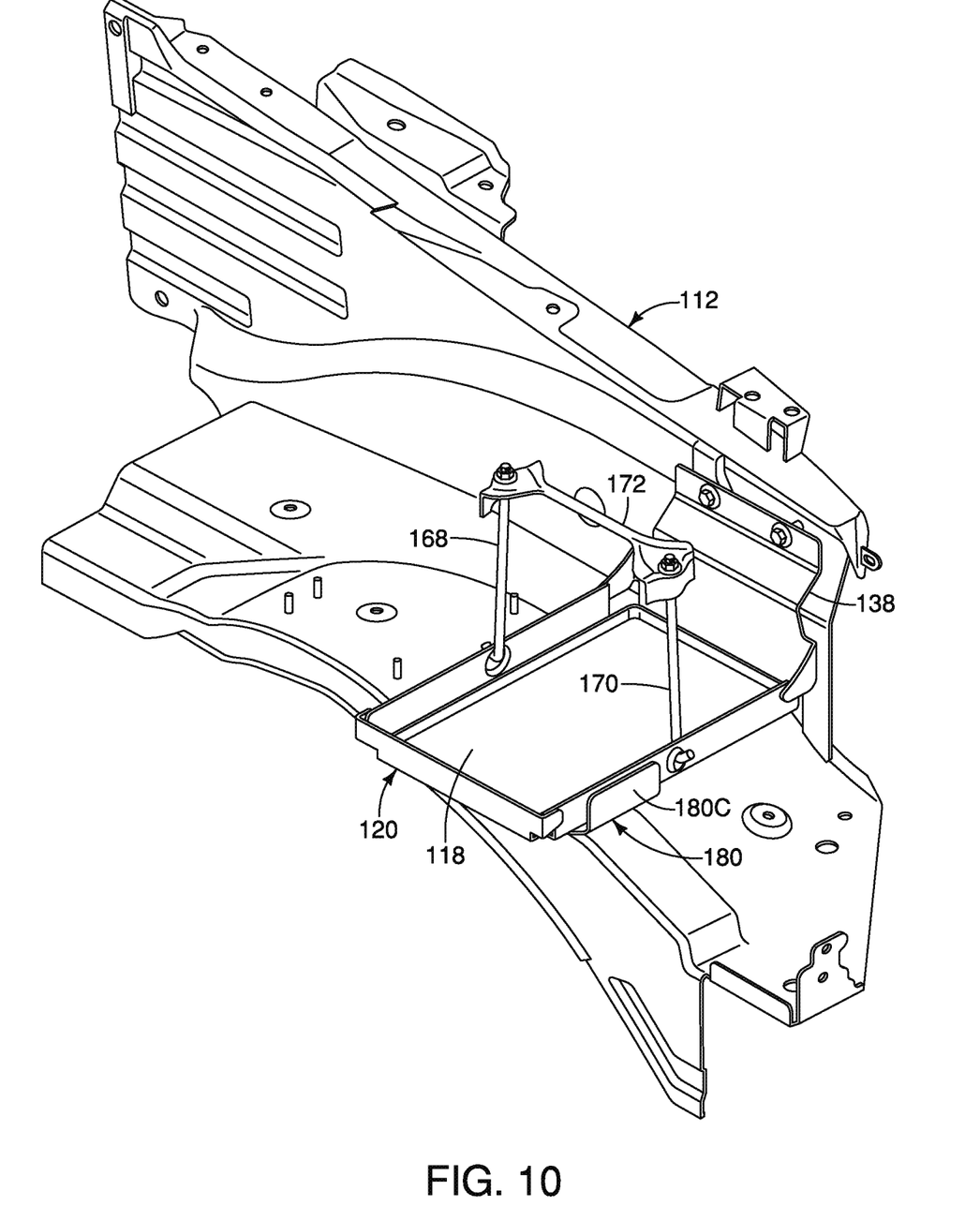
FIG. 10 is a perspective view of the battery bracket assembly of FIG. 9 connected to the vehicle frame.

The mounting bracket 20 includes a base 22, as shown in FIGS. 7 and 8. The base 22 is preferably substantially horizontal. The base 22 has a first end 22A and a second end 22B disposed opposite the first end 22A. The second end 22B is disposed forward of the first end 22A in the vehicle forward direction F. The first and second ends 22A and 22B extend in a lateral direction LA (FIGS. 2 and 7) of the vehicle. First and second sides 22C and 22D of the base extend between the first and second ends 22A and 22B of the base 22. The first and second sides 22C and 22D are oppositely disposed. The first and second sides 22A and 22B extend in a longitudinal direction LO (FIGS. 3 and 7) of the vehicle. A plurality of drain holes 24 are disposed in the base 22 of the mounting bracket 20. A plurality of reinforcing ribs 26 are disposed in the base 22 and extend in the vehicle longitudinal direction LO between the first and second ends 22A and 22B of the base 22.

A recessed portion 28 is disposed in the base 22 of the mounting bracket 20, as shown in FIGS. 7 and 8. At least one fastener hole 30 is disposed in the recessed portion 28 in the base 22 of the mounting bracket 20. The recessed portion 28 is shown having two fastener holes 30, although any suitable number of fastener holes can be used. As shown in FIG. 8, the fastener holes 30 are disposed in a portion of the recessed portion 28 disposed lower than the base 22 of the mounting bracket 20. A connecting portion 28A of the recessed portion 28 surrounds the fastener holes 30 and connects the fastener holes 30 to the base 22. The connecting portion 28A is disposed in a vertical direction between the fastener holes 30 and the base 22. In other words, the connecting portion 28A is disposed lower than the base 22 and above the fastener holes 30, as shown in FIG. 8.

A first wall 32 extends upwardly from the first end 22A of the base 22, as shown in FIG. 7. The first wall 32 preferably extends substantially along an entirety of the first end 22A of the base 22 in the lateral direction LA of the vehicle. A first tab 34 extends outwardly from a first end 32A of the first wall 32. A second tab 36 extends outwardly from a second end 32B of the first wall 32. The first and second tabs 34 and 36 are disposed at opposite ends 32A and 32B of the first wall 32.

A second wall 38 extends upwardly from the second end 22B of the base 22, as shown in FIG. 7. The second wall 38 preferably extends substantially along an entirety of the second end 22B of the base 22 in the lateral direction LA of the vehicle. A third tab 40 extends outwardly from a first end 38A of the second wall 38. A fourth tab 42 extends outwardly from a second end 38B of the second wall 38. The third and fourth tabs 40 and 42 are disposed at opposite ends 38A and 38B of the second wall 38.

Figure 5:
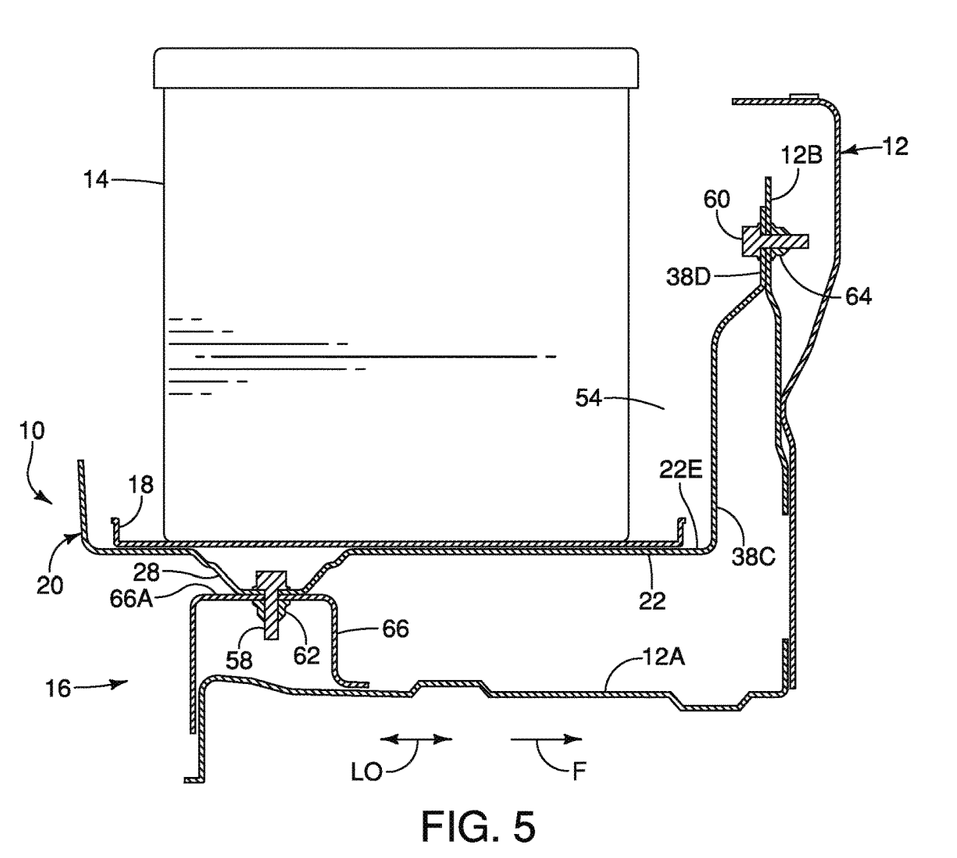
FIG. 5 is a side elevational view of the battery bracket assembly taken along line 5-5 of FIG. 1.
Figure 6:
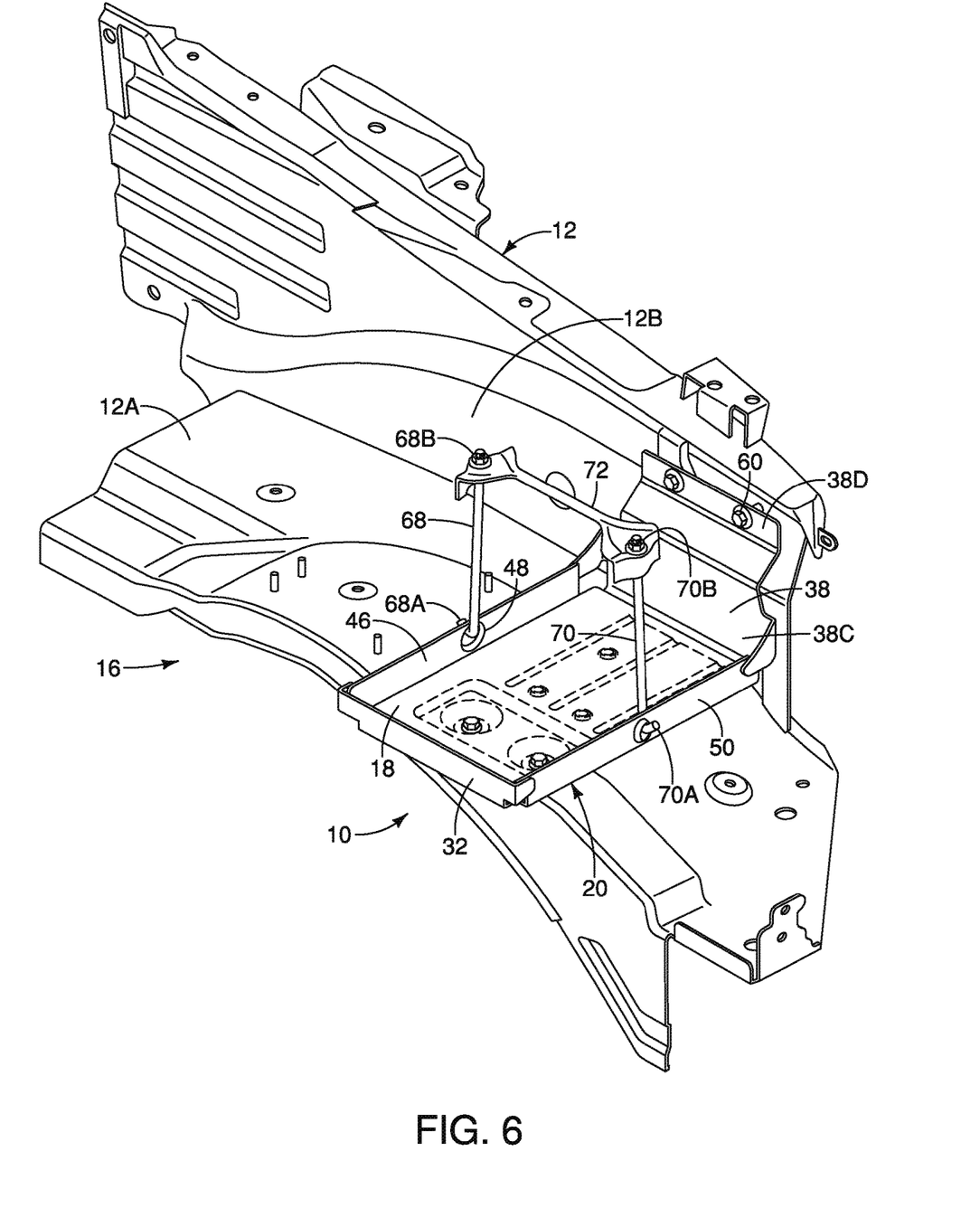
FIG. 6 is a perspective view of the battery bracket assembly of FIG. 1 attached to the vehicle frame.

The second wall 38 includes a first portion 38C extending from the second end 22B of the base 22, and a second portion 38D extending from the first portion 38C. The second portion 38D is offset from the first portion 38C. As shown in FIGS. 5 and 7, the second portion 38D is disposed forward of the first portion 38C in the vehicle longitudinal direction LO. At least one fastener hole 44 is disposed in the second wall 38 of the mounting bracket 20. Preferably, the at least one fastener hole 44 is disposed in the second portion 38D of the second wall 38. The second wall 38D is shown with two fastener holes 44, although the second wall can have any suitable number of fastener holes.

A third wall 46 extends from the first side 22C of the base 22, as shown in FIG. 7. The third wall 46 preferably extends substantially along an entirety of the first side 22C of the base 22 in the vehicle longitudinal direction LO. At least one battery fixing hole 48 is disposed in the third wall 46.

A fourth wall 50 extends from a second side 22D of the base 22, as shown in FIG. 7. The fourth wall 50 preferably extends substantially entirely along the second side 22D of the base 22 in the vehicle longitudinal direction LO. At least one battery fixing hole 52 is disposed in the fourth wall 50.

The mounting bracket 20 is preferably made of metal, such as a high strength steel. The mounting bracket 20 is preferably integrally formed as a one-piece member. The mounting bracket 20 is preferably stamped from a planar sheet of metal. To form the mounting bracket 20, the first wall 32 is bent upwardly relative to the base 22, such that the first wall 32 is preferably substantially perpendicular to the base 22. The second, third and fourth walls 38, 46 and 50 are similarly bent such that the second, third and fourth walls 38, 46 and 50 are substantially perpendicular to the base 22. The first and second walls 32 and 38 are substantially parallel and extend in the vehicle lateral direction LA. The third and fourth walls 46 and 50 are substantially parallel and extend in the vehicle longitudinal direction LO. The first and second walls 32 and 38 are preferably substantially perpendicular to the third and fourth walls 46 and 50. The first, second, third and fourth walls 32, 38, 46 and 50 define a cavity 54 for receiving the battery tray 18 and the battery 14.

The first and second tabs 34 and 36 of the first wall 32 are then bent such that the first and second tabs 34 and 36 extend toward the third and fourth walls 46 and 50, respectively. The third and fourth tabs 40 and 42 of the second wall 38 are then bent such that the third and fourth tabs 40 and 42 extend toward the third and fourth walls 46 and 50, respectively. The first, second, third and fourth tabs 34, 36, 40 and 42 are then engaged with the outer surfaces 46A and 50A of the third and fourth walls 46 and 50 and connected thereto in any suitable manner, such as by spot welding. The first and third tabs 34 and 40 are connected to the third wall 46. The first tab 34 is connected at a first end 46B of the third wall 46. The third tab 40 is connected at a second end 46C of the third wall 46. The second and fourth tabs 36 and 42 are connected to the fourth wall 50. The second tab 36 is connected at a first end 50B of the fourth wall 50. The fourth tab 42 is connected at a second end 50C of the fourth wall 50.

Openings 56 are defined in the mounting bracket 20 between each of the connected adjacent walls and the base 22, as shown in FIG. 7. One of the openings 56 is defined between the connected first and fourth walls 32 and 50 and the base 22. Similar openings 56 are defined in each of the other three corners of the mounting bracket 20. The openings 56 facilitate draining of any fluid that collects in the mounting bracket 20.

The mounting bracket 20 is preferably pre-treated with a phosphate coating, such as a zinc-phosphate coating, to improve corrosion resistance and to improve friction properties. The mounting bracket 20 then undergoes a cation coating treatment to further provide corrosion resistance and to provide the mounting bracket 20 with a desired color, such as black.

Figure 4:
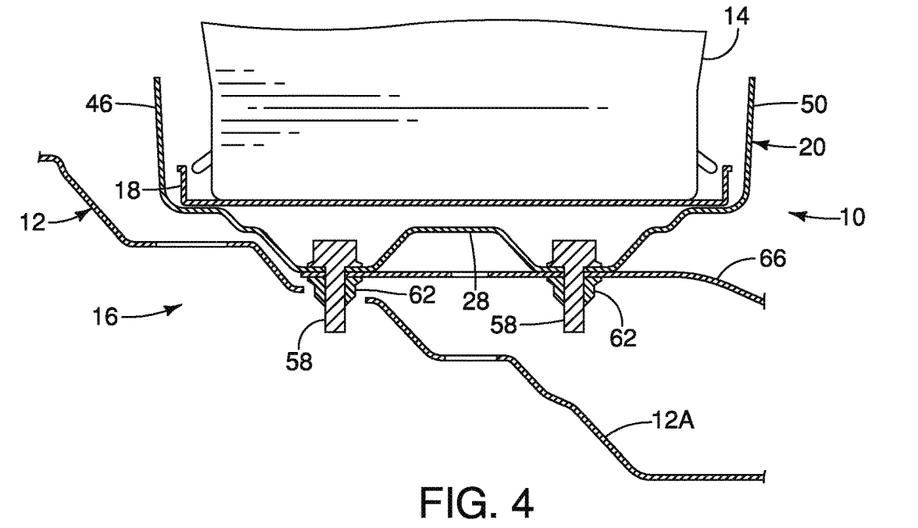
FIG. 4 is a rear elevational view in cross section of the battery bracket assembly taken along line 4-4 FIG. 1.

The mounting bracket 20 is shown connected to the vehicle frame 12 in FIGS. 1-6. The at least one fastener hole 30 in the base 22 and the at least one fastener hole 44 in the second wall 38 receive fasteners 58 and 60, respectively, to secure the mounting bracket 22 to the vehicle frame 12. Nuts 62 and 64 can be disposed on the fasteners 58 and 60, respectively, to facilitate securing the mounting bracket 30 to the vehicle frame 12, as shown in FIGS. 4 and 5. The fasteners 58 secure the base 22 of the mounting bracket 20 to the first portion 12A of the frame. The fasteners 60 secure the second wall 38 of the mounting bracket 20 to the second portion 12B of the frame 12. The recessed portion 28 in which the fasteners 58 are received and the second portion 38D of the second wall 38 that receives the fasteners 60 are offset from the base 22 and the first portion 38C of the second wall 38, respectively, to provide space between the fasteners 58 and 60 and the battery 14. The fasteners 58 are oriented substantially perpendicularly to the fasteners 60.

The battery tray 18 is disposed on the upper surface 22E of the base 22 of the mounting bracket 20 after securing the mounting bracket 20 to the vehicle frame 12, as shown in FIGS. 1-5. The battery tray 18 is disposed between the mounting bracket 20 and the battery 14. As shown in FIG. 5, the battery tray 18 overlies the recessed portion 28.

The battery assembly can further include a support member 66 disposed between the base 22 of the mounting bracket 20 and the vehicle frame 12, as shown in FIGS. 2-5, to facilitate securing the mounting bracket 20 to the frame 12. The support member 66 has fastener openings, as shown in FIGS. 4 and 5, aligned with the fastener openings 30 in the base 22 of the mounting bracket 20 such that the fastener 5$ is received by the base 22 of the mounting bracket 20 and the support member 66. As shown in FIGS. 1-5, the support member 66 can be used when the first portion 12B receiving the mounting bracket 30 is not entirely substantially planar. As shown in FIGS. 1-5, a rear portion of the first portion 12A of the frame 12 is disposed lower than a front portion of the first portion 12A proximal the second portion 12B. The support member 66 is fixed to the first portion 12A of the frame 12 to provide a planar surface 66A to support the mounting bracket 20. The planar surface 66A is disposed lower than the first portion 12A that directly receives the mounting bracket 20, as shown in FIG. 3, such that the planar surface accommodates the recessed portion 28 of the base 22 of the mounting bracket 20. The support member 66 is preferably substantially U-shaped, as shown in FIGS. 3 and 5. The support member 66 can be made of any suitable material.

As shown in FIGS. 1-3 and 6, first and second fixing rods 68 and 70 secure the battery 14 to the mounting bracket 20. A mounting bar 72 is disposed on an upper surface 14A of the battery 14. The first and second fixing rods 68 and 70 extend downwardly from the mounting bar 72. The first fixing rod 68 has a hook 68A formed at a lower end that is received by the mounting hole 48 in the third wall 46. The second fixing rod 70 has a hook 70A formed at a lower end that is received by the mounting hole 52 in the fourth wall 50 of the mounting bracket 20. Upper ends of the first and second fixing rods 68B and 70B are preferably threaded and are received by fastener holes in the mounting bar 32. Nuts 74 and 76 are threadedly received by the first and second fixing rods 68 and 70, respectively, to securely retain the battery 14 on the mounting bracket 20.

As shown in FIGS. 9-12, a mounting bracket in accordance with another illustrated exemplary embodiment of the present invention is substantially similar to the mounting bracket of the exemplary embodiment illustrated in FIGS. 1 to 8 except for the differences described below. Similar parts are identified with similar reference numerals, except increased by 100 (i.e., 1xx, accordingly).

Figure 11:
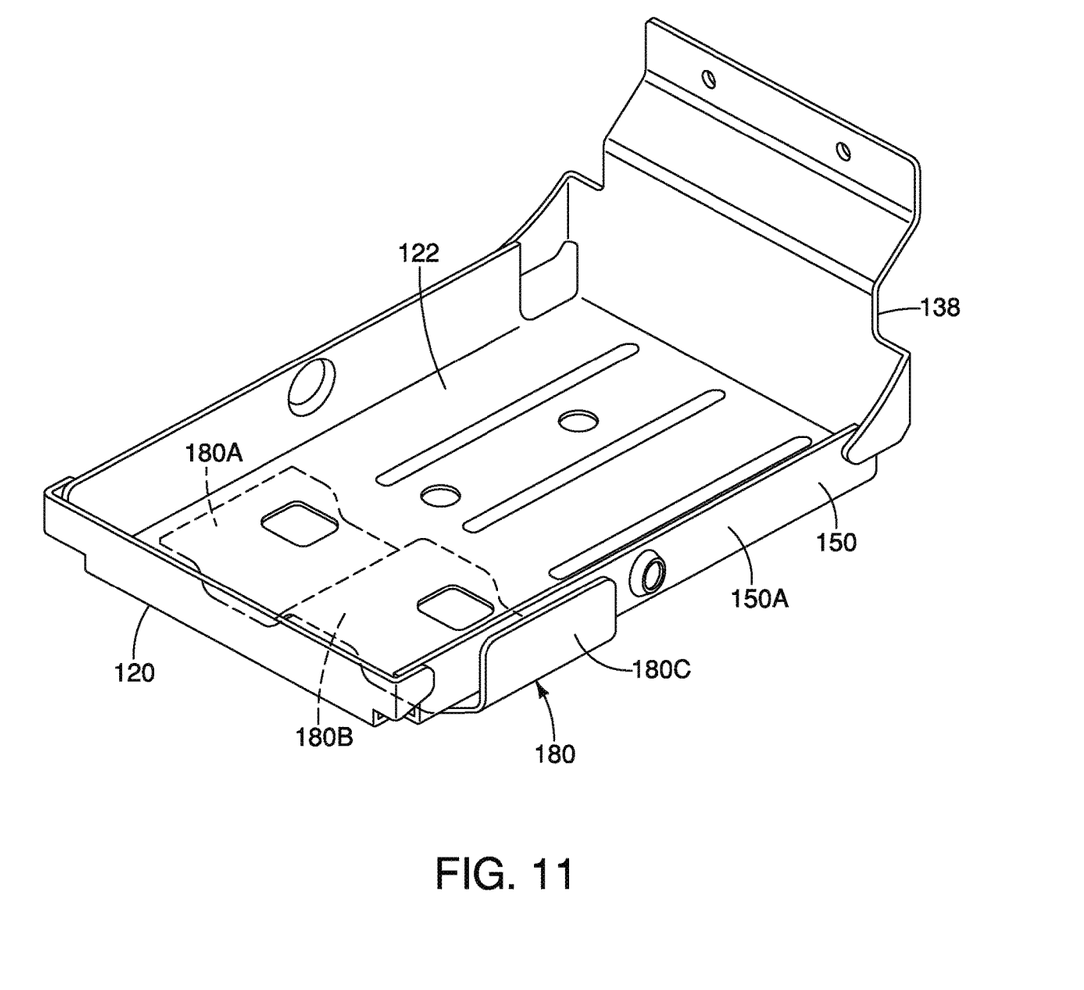
FIG. 11 is a perspective view of the battery bracket assembly of FIG. 9.
Figure 12:
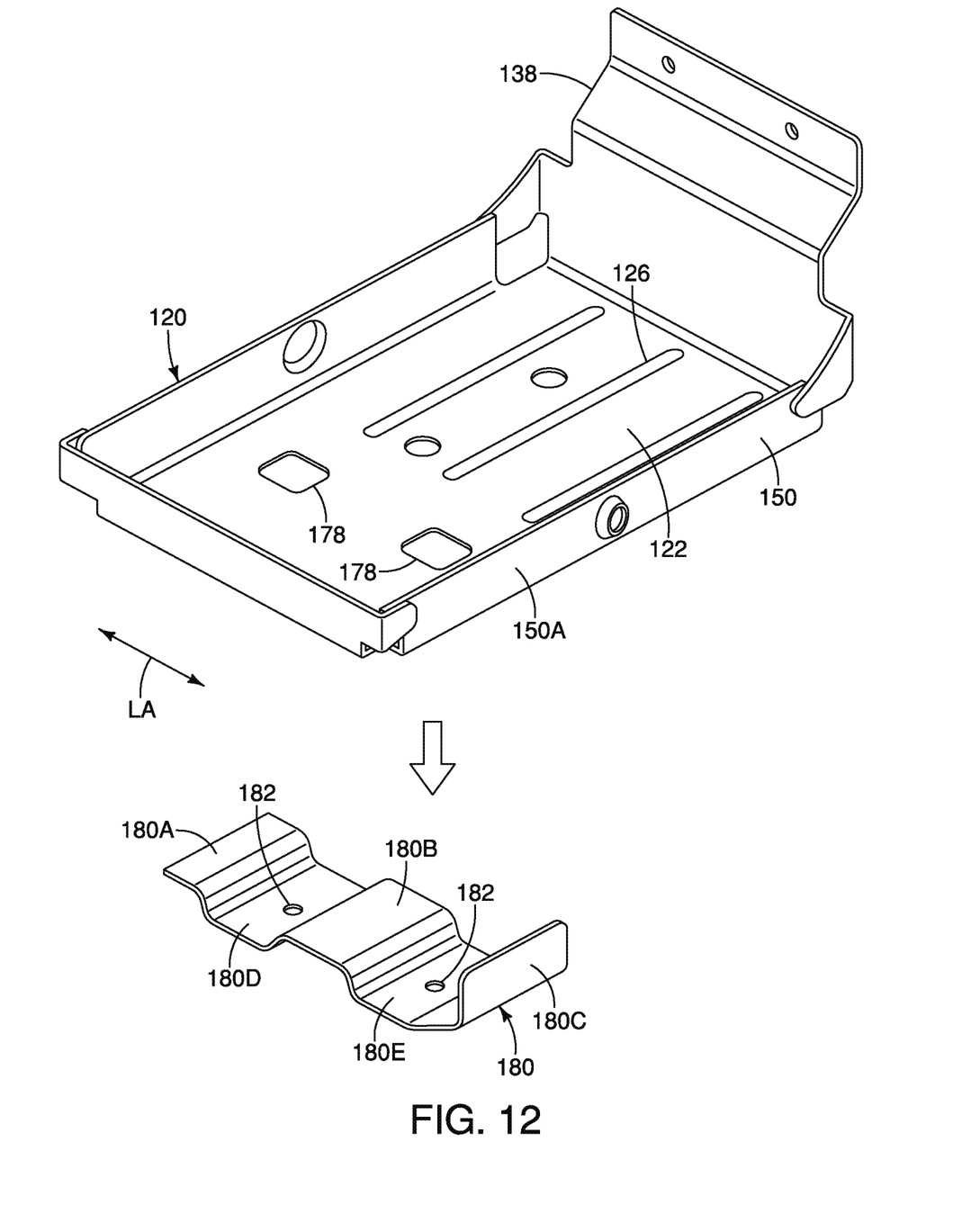
FIG. 12 is an exploded assembly view of the battery bracket assembly of FIG. 11.

The mounting bracket 120 in accordance with the exemplary embodiment of FIGS. 9-12 is substantially similar to the mounting bracket of FIGS. 1-8 except that the mounting bracket of FIGS. 9-12 does not have the recessed portion 28 (FIGS. 7 and 8) in the base 122 of the mounting bracket 120. The base 122 also includes at least one fastener opening 178 disposed in the base 122 in which the at least one fastener opening 178 is substantially planar with the base 122. As shown in FIGS. 11 and 12, the base 122 has two fastener openings 178, although the base can have any suitable number of fastener openings. The fastener openings 178 are sized such that a fastener can pass through the fastener opening 178. As shown in FIGS. 11 and 12, the fastener openings 178 are substantially rectangular, although the fastener openings can have any suitable shape. As shown in FIG. 12, the base 122 of the mounting bracket 120 is substantially planar. A plurality of reinforcing ribs 126 extend upwardly from the base 122. The mounting bracket 120 is formed substantially similarly to the mounting bracket 20 of FIGS. 1-8.

A reinforcing bracket 180 is connected to the mounting bracket 120, as shown in FIGS. 9-12. The reinforcing bracket 180 includes at least one fastener hole 182 aligned with the at least one fastener opening 178 in the base 122 of the mounting bracket 120. As shown in FIGS. 11 and 12, the reinforcing bracket 180 has two fastener holes 182, although the reinforcing bracket 180 can have any suitable number of fastener holes. Each fastener hole 182 in the reinforcing bracket 180 is aligned with one of the fastener openings 178 in the base 122 of the mounting bracket 120.

The reinforcing bracket 180 includes first and second portions 180A and 180B connected to a lower surface of the base 122 of the mounting bracket 120 and a third portion 180C connected to an outer surface 150A of the fourth wall 150 of the mounting bracket 120. The at least one fastener holes 182 are disposed in the fourth and fifth portions 180D and 180E of the reinforcing bracket 180 spaced from the lower surface of the mounting bracket 120. Each of the fourth and fifth portions 180D and 180E has a fastener hole 182, as shown in FIG. 12.

The first and second portions 180A and 180B of the reinforcing bracket 180 are substantially planar, as shown in FIGS. 11 and 12. The fourth and fifth portions 180D and 180E are substantially planar. Each of the fourth and fifth portions 180D and 180E are offset from each of the first and second portions 180A and 180B. In other words, the fourth and fifth portions 180D and 180E are disposed lower than the first and second portions 180A and 180B. The fourth portion 180D is disposed between the first and second portions 180A and 180B in the lateral direction LA. The fifth portion 180E is disposed between the second portion 180B and the third portion 180C in the lateral direction LA. The first and second portions 180A and 180B contact the lower surface of the base 122 of the mounting bracket 120, such that the reinforcing bracket 180 can be connected thereto. The first and second portions 180A and 180B are connected to the lower surface of the base 122 of the mounting bracket 120 in any suitable manner, such as by spot welding. The reinforcing bracket 180 is illustrated having three connections to the mounting bracket 120, the first portion 180A, the second portion 180B and the third portion 180C, although the reinforcing bracket can have any suitable numbers of connections.

The third portion 180C is substantially perpendicular to each of the first, second, fourth and fifth portions 180A, 180B, 180D and 180E of the mounting bracket 180. The third portion 180C contacts the outer surface 150A of the fourth wall 150 of the mounting bracket 120, such that the reinforcing bracket 180 can be connected thereto. The third portion 180C is connected to the outer surface 150A of the fourth wall 150 in any suitable manner, such as by spot welding.

The fourth and fifth portions 180D and 180E are spaced from the lower surface of the base 122 when the reinforcing bracket 180 is connected to the mounting bracket 180, as shown in FIGS. 11 and 12. The fasteners can be inserted through the fastener openings 178 in the base 122 of the mounting bracket 120 to be received by the fastener holes 182 in the fourth and fifth portions 180D and 180E of the reinforcing bracket 180.

The reinforcing bracket 180 can be made of any suitable material, such as a high tensile steel. The reinforcing bracket 180 is preferably integrally formed as a one-piece member.

The mounting bracket 120 is connected to the frame 112 in a similar manner as the mounting bracket of FIGS. 1-8. The reinforcing bracket 180, which is fixedly connected to the mounting bracket 120, provides a first connection to the frame 112. The second wall 138 of the mounting bracket provides a second connection to the frame 112. The fastener holes 182 in the reinforcing bracket 180 and the second wall 138 of the mounting bracket 120 are spaced from the battery 114, similarly as the mounting bracket 20 of FIGS. 1-8. The fastener openings 178 in the base 122 provide access to the fastener holes 182 in the reinforcing member 180, and the fastener openings 182 allow the fasteners to pass therethrough to access the fastener holes 182.

A tray 118 can be disposed on the base 122 of the mounting bracket 120. The battery 114 is connected to the mounting bracket 120 with the first and second fixing rods 168 and 170 and the mounting bar 172 in a similar manner as the battery 14 of FIGS. 1-6.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle frame equipped with the wiring harness connector cover assembly. Accordingly, these terms, as utilized to describe the present invention should be interpreted relative to a vehicle equipped with the wiring harness connector cover assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and fractions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A battery bracket assembly for a vehicle comprising:
   a mounting bracket configured to be connected to a vehicle frame and to receive a battery, the mounting bracket including
   a base;
   a first wall extending upwardly from a first end of the base;
   a second wall extending upwardly from a second end of the base;
   first and second tabs extending from first and second ends of the first wall, the first and second tabs extending toward the second wall;
   third and fourth tabs extending from first and second ends of the second wall, the third and fourth tabs extending toward the first wall;
   a third wall extending from a first side of the base;
   a fourth wall extending from a second side of the base; and
   at least one first fastener hole disposed in a recessed portion of the base,
   the first and third tabs being connected to and overlapping the third wall and the second and fourth tabs being connected to and overlapping the fourth wall.

2. The battery bracket assembly according to claim 1, further comprising
   the mounting bracket is integrally formed as a one-piece member.

3. The battery bracket assembly according to claim 2, wherein
   the mounting bracket is made of metal.

4. The battery bracket assembly according to claim 1, wherein
   the first and third tabs are welded to the third wall, and the second and fourth walls are welded to the fourth wall.

5. The battery bracket assembly according to claim 1, wherein
   the first tab is connected to a first end of the third wall, and the second tab is connected to a first end of the fourth wall.

6. The battery bracket assembly according to claim 5, wherein
   the third tab is connected to a second end of the third wall, and the fourth tab is connected to a second of the fourth wall.

7. The battery bracket assembly according to claim 1, wherein
   at least one second fastener hole is disposed in the second wall of the mounting bracket.

8. The battery bracket assembly according to claim 7, wherein
   the second wall includes a first portion extending from the second end of the base and a second portion extending from the first portion, the second portion being offset from the first portion.

9. The battery bracket assembly according to claim 8, wherein
   the at least one second fastener hole is disposed in the second portion of the second wall of the mounting bracket.

10. The battery assembly according to claim 1, wherein
    a battery is configured to be received by the base above the at least one fastener hole.

11. A battery assembly for a vehicle comprising:
a vehicle frame;
a mounting bracket connected to the vehicle frame; and
a battery mounted to the mounting bracket;
the mounting bracket including
- a base;
- at least one first fastener hole disposed in a recessed portion of the base;
- a first wall extending upwardly from a first end of the base;
- a second wall extending upwardly from a second end of the base;
- at least one second fastener hole disposed in the second wall of the base;
- first and second tabs extending from first and second ends of the first wall, the first and second tabs extending toward the second wall;
- third and fourth tabs extending from first and second ends of the second wall, the third and fourth tabs extending toward the first wall;
- a third wall extending from a first side of the base; and
- a fourth wall extending from a second side of the base,
- the first and third tabs being connected to and overlapping the third wall, and the second and fourth tabs being connected to and overlapping the fourth wall, and
- the at least one first and second fastener holes receiving a fastener to secure the mounting bracket to the vehicle frame, the recessed portion spacing each of the fasteners received by the at least one fastener holes from the battery.

12. The battery assembly according to claim 11, wherein a tray is disposed between the base of the mounting bracket and the battery.

13. The battery assembly according to claim 11, wherein a support member is disposed between the base of the mounting bracket and the frame, the at least one fastener received by the base being received by the support member.

14. The battery assembly according to claim 11, wherein the battery is disposed above the at least one fastener hole in a longitudinal direction of the at least one fastener hole.

15. The battery assembly according to claim 11, wherein each of the fasteners received by the at least one fastener holes is inserted in the at least one fastener hole from a battery side of the base.

16. A battery bracket assembly for a vehicle comprising:
a mounting bracket configured to be connected to a vehicle frame and to receive a battery, the mounting bracket including
- a base;
- a first wall extending upwardly from a first end of the base;
- a second wall extending upwardly from a second end of the base;
- first and second tabs extending from first and second ends of the first wall, the first and second tabs extending toward the second wall;
- third and fourth tabs extending from first and second ends of the second wall, the third and fourth tabs extending toward the first wall;
- a third wall extending from a first side of the base;
- a fourth wall extending from a second side of the base; and
- at least one first fastener hole disposed in the base,
- the first and third tabs being connected to and overlapping the third wall and the second and fourth tabs being connected to and overlapping the fourth wall; and
a reinforcing bracket connected to the mounting bracket, the reinforcing bracket including at least one second fastener hole aligned with and spaced from the at least one fastener hole in the base of the mounting bracket.

17. The battery bracket assembly according to claim 16, wherein
the reinforcing bracket includes a first portion connected to a lower surface of the base of the mounting bracket and a second portion connected to an outer surface of the fourth wall of the mounting bracket.

18. The battery bracket assembly according to claim 16, wherein
the at least one fastener opening is disposed in a third portion of the reinforcing bracket spaced from the lower surface of the base mounting bracket.

19. The battery bracket assembly according to claim 16, wherein
the at least one first fastener hole and the at least one second fastener hole are configured to receive a fastener from an upper surface of the base.

20. The battery bracket assembly according to claim 16, wherein
the at least one first fastener hole is larger than the at least one second fastener hole.

* * * * *